E. J. BRENNAN.
CONVEYER BELT.
APPLICATION FILED AUG. 4, 1921.
1,428,878.
Patented Sept. 12, 1922.
2 SHEETS—SHEET 1.
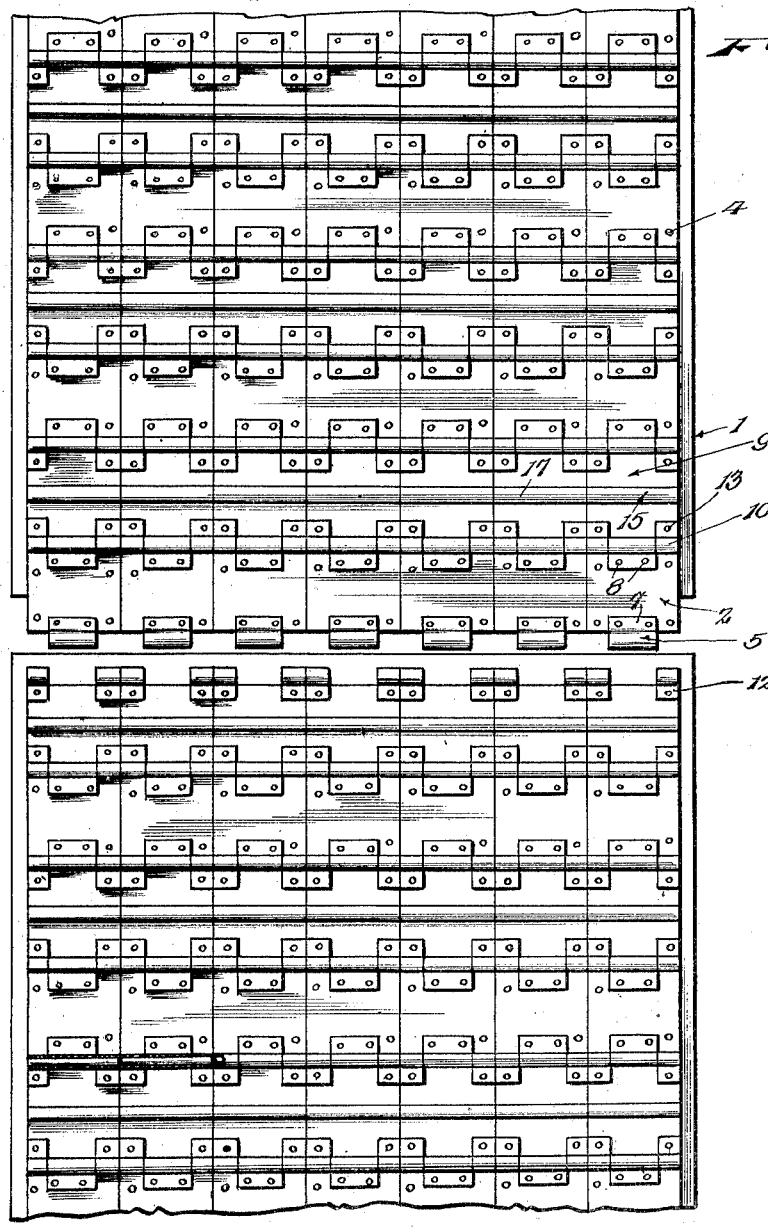
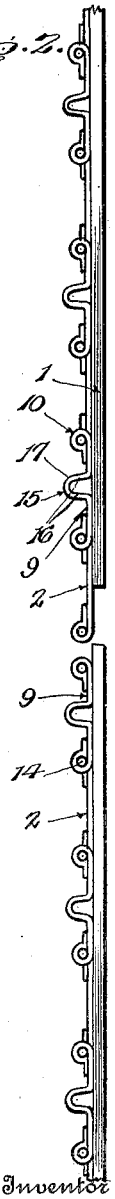
Inventor
E. J. Brennan.
By Lacey & Lacey, Attorney

E. J. BRENNAN.
CONVEYER BELT.
APPLICATION FILED AUG. 4, 1921.

1,428,878.

Patented Sept. 12, 1922.
2 SHEETS—SHEET 2.

Inventor
E. J. Brennan.
By Lacey & Lacey, Attorneys

Patented Sept. 12, 1922.

1,428,878

UNITED STATES PATENT OFFICE.

EDWARD J. BRENNAN, OF CHICAGO, ILLINOIS.

CONVEYER BELT.

Application filed August 4, 1921. Serial No. 489,735.

*To all whom it may concern:*

Be it known that I, EDWARD JAMES BRENNAN, a citizen of the United States, residing at Chicago, in the county of Cook and State of Illinois, have invented certain new and useful Improvements in Conveyer Belts, of which the following is a specification.

This invention relates to improvements in the construction of the belts of endless conveyers. The ordinary conveyer belt, where the conveyer is of the type designed for heavy duty work such for example as the loading of coal and ore cars or the loading and unloading of other raw material of a coarse and heavy nature, comprises a plurality of supposed united plies of leather, and such a belt is therefore relatively expensive to manufacture. Furthermore, the surface of the belt, being unprotected, becomes worn and torn by the material being handled necessitating repairs or replacement at a considerable cost not only for material but also for time and labor. It is therefore the primary object of the present invention to provide a conveyer belt of such construction that it will be equally as flexible as the usual multiple leather belt and which will embody means for protecting its material supporting surface from contact with the material so that the belt is much more durable than the usual all leather belt and will less frequently require repairs to be made thereto.

Generally speaking the invention contemplates the provision of a conveyer belt comprising a foundation of flexible sheet material such for example as leather, which foundation does not require however to be made up of as many plies of this material as the ordinary all leather belt, and an arrangement of wear plates upon the supporting surface of the foundation so mutually linked as to not impair the flexibility of the belt and yet afford ample protection to the material supporting surface thereof.

Another object of the invention is to provide in a structure such as that outlined above, a construction of the wear plates such that, while the plates are mutually linked together and are secured to the belt, yet stretching of the belt or its contraction is compensated for substantially as effectually as though the belt were made of leather throughout.

Another object of the invention is to so construct certain of the wear plates that they will serve the same purpose as the usual slats provided upon a belt of this type and will thus be adapted to collect and retain the material discharged on the belt and insure of its being conveyed in a positive manner to the point of delivery.

Another object of the invention is to so construct and arrange the wear plates that not only will the belt be as flexible longitudinally as the ordinary all leather belt, but it will likewise possess the same degree of lateral flexibility as this old type of belt so that the belt of the invention is adaptable for use under any conditions where an all leather belt may be employed and where universal flexibility is one of the requirements.

In the accompanying drawings:

Figure 1 is a plan view of the meeting end portions of a conveyer belt constructed in accordance with the present invention;

Figure 2 is a side elevation of the structure shown in Figure 1;

The belt embodying the present invention includes in its structure a foundation 1 which may be of any flexible sheet material found suitable for the purpose and preferably of leather, the foundation comprising one or more plies of such material although it is not required to embody a relatively great number of plies which are required to make up the ordinary all leather belt. The foundation 1 is, as usual, formed in a sheet of the desired width and length the ends of which are to be brought together and united so as to produce an endless belt adapted for travel over drums or the like in the customary manner.

The invention contemplates, as previously stated, the provision upon the material supporting surface of the foundation, of a plurality of mutually linked wear plates of a novel construction and arranged in a novel manner. For this purpose two types or kinds of plates are employed, one of the plates being shown in detail in Figures 3 and 4 and the other in Figures 5 and 6.

Figure 3:
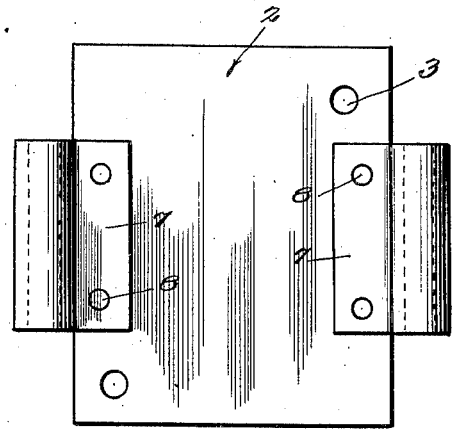
Figure 3 is a plan view of one of the wear plates.
Figure 4:
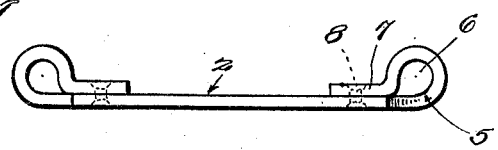
Figure 4 is an edge elevation of the plate shown in Figure 3.

The plate shown in Figure 3 is indicated in general by the numeral 2 and the same is preferably of the flat rectangular form illustrated and is provided in diagonally opposite corners with openings 3 for the passage of fastening elements 4 designed to secure it to the material supporting surface of the foundation. The securing elements 4 may be in the nature of flat headed bolts, or rivets. Each of the plates 2, in its blank form, is provided at its front and rear edges with extensions 5 which are turned back upon themselves, to provide pintle eyes 6, the terminal portion of each extension being bent to provide a flat attaching portion 7 which is brought to rest against the outer face of the plate 2 and is secured to the plate by means of rivets or other fastening elements indicated by the numeral 8. In the construction illustrated, the pintle eyes 6 are of a width less than the length of the edges of the plate 2 at which they are formed and they are equi-distantly spaced from the ends of the said edges as best shown in Figure 3.

Figure 5:
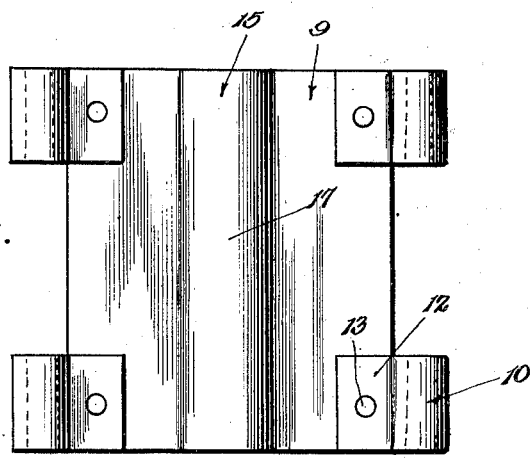
Figure 5 is a plan view of another one of the wear plates.
Figure 6:
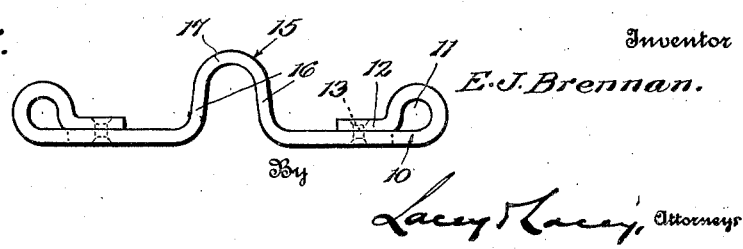
Figure 6 is an edge elevation thereof.

The companion plates are indicated in general by the numeral 9 and are of the rectangular form shown in Figure 5 of the drawings and of substantially the same dimensions as the plates 2, and each of the plates 9 is provided at its front and rear edges and at its corners with extensions 10 which are overturned to provide pintle eyes 11 having flat terminal portions 12 resting against the upper or outer face of the plate 9 and secured thereto by rivets or other fastening elements 13. Being located at the corners of the plate 9, the pintle eyes 11 at either side of the plate are designed to straddle the pintle eye 6 provided at the adjacent edge of the companion plate 2 as shown in Figure 1 of the drawings, and pintle pins 14 are fitted through the registering eyes of the adjacent companion plates and serve to pivotally connect or link the plates together. At this point it will be observed, and particularly by reference to Figure 1 of the drawings, that the plates 2 and 9 are arranged alternately longitudinally of the belt structure as a whole and that a number of each of these plates are arranged side by side transversely of the foundation 1 of the belt, the plates abutting or substantially abutting end to end. Thus the material supporting surface of the foundation 1 may be said to be protected by longitudinally alternating transverse series of the plates 2 and 9. It will also be evident at this point that while the plates 2 are secured by the rivets or bolts 4 to the material supporting surface of the foundation 1, the plates 9 are left unattached as regards their association with the foundation although they are securely retained in place by the link connection provided between adjacent plates throughout the series.

In order that the plates 9 may serve not only their primary function of protecting from wear the material supporting surface of the foundation 1, but may also serve the same purpose as the transverse slats usually provided upon the corresponding surface of conveyer belts of the all leather type, each of the said plates 9 has its intermediate portion struck up to provide a transverse rib indicated by the numeral 15, this rib comprising spaced portions 16 projecting upwardly from the plane of the body of the plate 9 and a connecting portion 17 preferably rounded in a front to rear direction. Inasmuch as the plates 2 and 9 are arranged in transverse series alternating longitudinally of the foundation of the belt, the plates 9 of each series will be in alignment transversely of the belt foundation and therefore the ribs 15 of the said plates in each series will be in alignment so that in effect a continuous rib is provided extending transversely of the belt, and this rib serves to collect and retain, for travel with the belt, the material discharged onto the conveying or upper stretch of the belt, under working conditions. The wear plates, and particularly the plates 9, are to be formed from sheet material which is more or less resilient, being for example stamped or pressed from sheet steel, and it will therefore be evident that under working conditions, should the stress imposed upon the belt, or atmospheric conditions, be such as to create a tendency for the belt foundation to stretch, this change in form may take place without any injury to the foundation and without disturbing the union of the wear plates of the foundation, inasmuch as under these conditions the plates 9 may for the time being become somewhat elongated through a spreading of the spaced portions 16 of the ribs 15, the resiliency of the plates serving however to restore them to normal form when the conditions cease to prevail.

By reference to Figures 1 and 2 of the drawings it will be observed that the wear plates at the ends of the foundation constitute means for connecting these ends together, the series of plates at one end of the foundation, as for example one of the series of plates 2, being arranged to project a suitable distance beyond the end edge of the foundation and being linked to the adjacent sides of the series of plates 9 at the other end edge of the foundation.

From the foregoing description of the invention it will be seen that there is provided a conveyer belt in which the foundation may be built up of a less number of plies than ordinarily and in which the material supporting surface of the foundation is protected by the series of wear plates 2 and 9 arranged in such manner as to effectually serve this purpose and at the same time reinforce the foundation and consequently render the belt as a whole more durable, without however impairing its flexibility so that the belt is not only substantially as flexible in a longitudinal direction as the ordinary all leather belt, but it is also flexible transverse to substantially the same degree. It will also be evident that the ribs 15, because of the peculiar manner in which they are formed, serve not only the purpose of collecting and retaining the material to be conveyed, but also to compensate for any stretching or contraction of the leather foundation of the belt.

Having thus described the invention what is claimed as new is:

1. A conveyer belt comprising a foundation of flexible sheet material, and wear plates attached thereto and mutually connected.

2. A conveyer belt comprising a foundation of flexible sheet material, and a longitudinally extending series of wear plates attached thereto and mutually connected.

3. A conveyer belt comprising a foundation of flexible sheet material, and mutually connected wear plates upon the surface of the foundation, certain of the wear plates being capable of elongation in the direction of the length of the belt.

4. A conveyer belt comprising a foundation of flexible sheet material, and mutually connected wear plates upon the surface of the foundation, certain of said plates being resilient and between their ends being outwardly bulged to provide for elongation of the said plates under stretching stresses imposed upon the foundation.

5. A conveyer belt comprising a foundation of flexible sheet material, and mutually connected wear plates upon the surface of the foundation, certain of the plates being resilient and having their intermediate portions outwardly bulged to provide transverse ribs capable of expansion and contraction through the inherent resiliency of the plates to compensate for stretching and contraction of the foundation and to serve also as means for accumulating and retaining the material to be handled upon the belt.

6. A conveyer belt comprising a foundation of flexible sheet material, and a longitudinal series of wear plates upon the surface thereof, the said plates being provided at their opposite ends with pintle eyes, and pintle pins fitting in the eyes and mutually connecting the plates.

In testimony whereof I affix my signature.

EDWARD J. BRENNAN. [L. S.]